US012669811B2

(12) United States Patent
Wu et al.

(10) Patent No.: US 12,669,811 B2
(45) Date of Patent: Jun. 30, 2026

(54) PROCESS MANAGEMENT METHOD

(71) Applicant: INDUSTRIAL TECHNOLOGY RESEARCH INSTITUTE, Hsinchu (TW)

(72) Inventors: Po-Hsun Wu, Taichung City (TW); Xiao-Yi Su, Taichung City (TW); Chia-Chin Chuang, Kaohsiung City (TW); Chien-Yi Lee, Taichung City (TW); Shao-Ku Huang, Taichung City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 609 days.

(21) Appl. No.: 18/138,239

(22) Filed: Apr. 24, 2023

(65) Prior Publication Data

US 2024/0353819 A1     Oct. 24, 2024

(51) Int. Cl.
*G05B 19/418*          (2006.01)
(52) U.S. Cl.
CPC .............................. *G05B 19/41865* (2013.01)
(58) Field of Classification Search
CPC ............................................... G05B 19/41865
See application file for complete search history.

(56) References Cited

U.S. PATENT DOCUMENTS

2017/0351226 A1   12/2017  Bliss et al.
2020/0401124 A1   12/2020  Dillon et al.
(Continued)

FOREIGN PATENT DOCUMENTS

| CN | 113705944 A | 11/2021 |
|----|-------------|---------|
| TW | 202109282 A | 3/2021 |
| TW | 202203076 A | 1/2022 |

OTHER PUBLICATIONS

Chen, "Integration of Building Information Modeling and Internet of Things for Facility Maintenance Management", Hong Kong University of Science and Technology, Mar. 2019, total of 24 pages.

(Continued)

*Primary Examiner* — Gary Collins

(74) *Attorney, Agent, or Firm* — Birch, Stewart, Kolasch & Birch, LLP

(57)          ABSTRACT

A process-management system and a process-management method are provided. The process-management system includes a process-planning module, a process-management module, and a process-executing module. The process-planning module stores a preset workflow and is configured to receive a first input instruction and a second input instruction. The process-planning module provides the preset workflow according to the first input instruction, and adjusts the preset workflow according to the second input instruction to generate a customized workflow. The process-management module is electrically connected to the process-planning module and is configured to generate a work instruction according to the preset workflow or the customized workflow. The process-executing module is electrically connected to the process-management module and configured to process a workpiece according to the work instruction.

1 Claim, 9 Drawing Sheets

(56) References Cited

U.S. PATENT DOCUMENTS

| | | |
|---|---|---|
| 2021/0208571 A1 | 7/2021 | Thomsen et al. |
| 2022/0266445 A1* | 8/2022 | Dambman ............. G06Q 50/04 |

OTHER PUBLICATIONS

Munir, "Development of A Building Information Modelling Asset (BIMAsset) Value Realisation Model", The University of Liverpool Repository, Jul. 2019, total of 439 pages.
Taiwanese Office Action and Search Report for Taiwanese Application No. 112115158, dated Aug. 31, 2023.

* cited by examiner

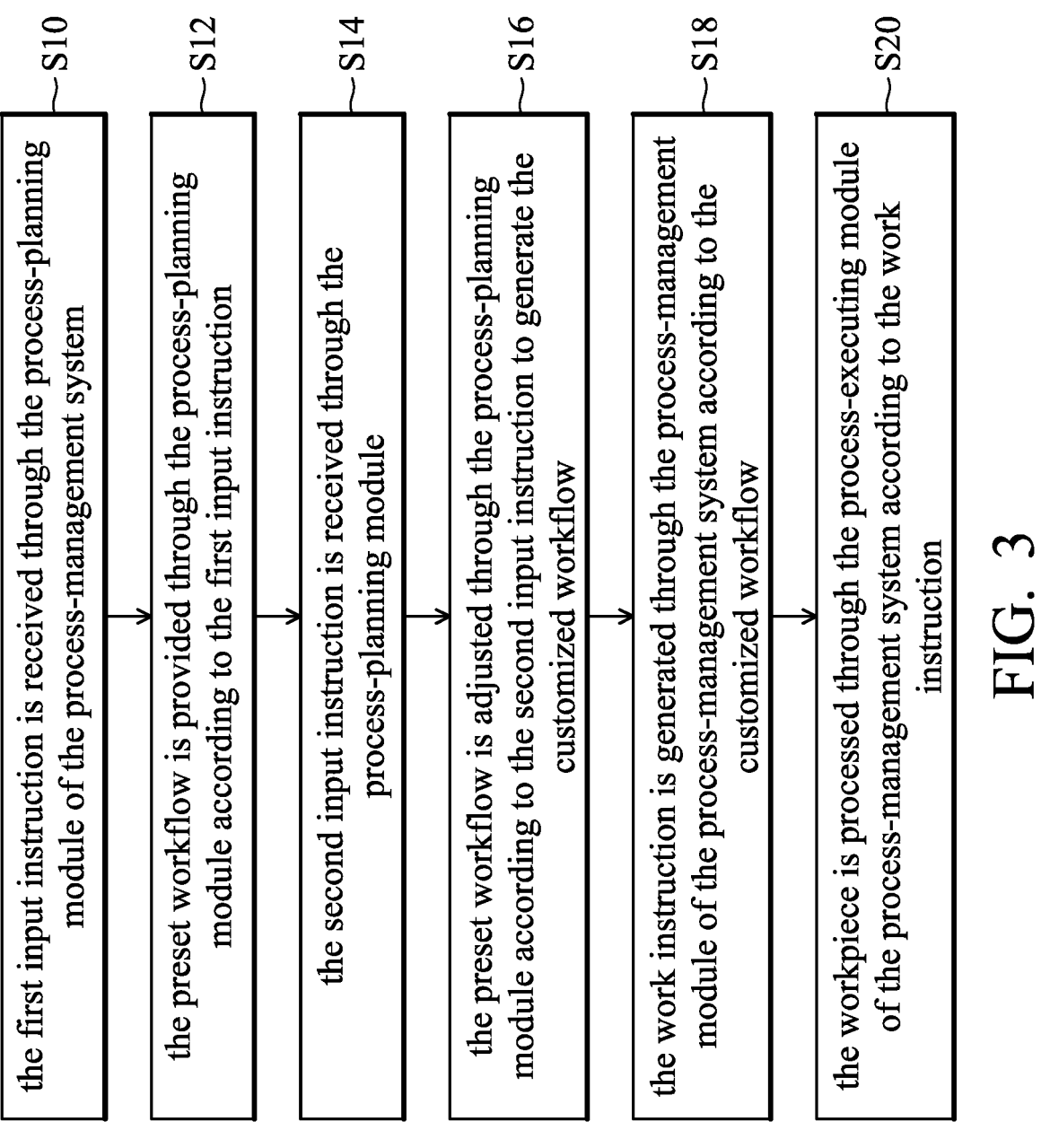

the first input instruction is received through the process-planning module of the process-management system —S10 the preset workflow is provided through the process-planning module according to the first input instruction —S12 the second input instruction is received through the process-planning module —S14 the preset workflow is adjusted through the process-planning module according to the second input instruction to generate the customized workflow —S16 the work instruction is generated through the process-management module of the process-management system according to the customized workflow —S18 the workpiece is processed through the process-executing module of the process-management system according to the work instruction —S20

FIG. 3

PROCESS MANAGEMENT METHOD

TECHNICAL FIELD

The disclosure relates to a process management system and a process management method.

BACKGROUND

In order to achieve increasingly complex product designs, the required number of machining or processing devices has increased, and the sorting of machining devices or processing devices has become finer. However, most of the management systems of these processing devices are operated independently, or they are only partially interconnected, which is not conducive to the effective monitoring of the entire processing process. In addition, whenever the product design is changed, it takes a lot of manpower to re-plan the manufacturing process, and it is not easy to estimate the manufacturing cost. Even though the existing processing devices and their management systems have initially met the established requirements, there are still deficiencies in various aspects. Therefore, it is clear that there is a need to develop a new process-management system to effectively plan the process and integrate various processing devices.

SUMMARY

In an embodiment, the present disclosure provides a process-management system. The process-management system includes a process-planning module, a process-management module, and a process-executing module. The process-planning module stores a preset workflow and is configured to receive a first input instruction and a second input instruction. The process-planning module provides the preset workflow according to the first input instruction, and adjusts the preset workflow according to the second input instruction to generate a customized workflow. The process-management module is electrically connected to the process-planning module and is configured to generate a work instruction according to the preset workflow or the customized workflow. The process-executing module is electrically connected to the process-management module and configured to process a workpiece according to the work instruction.

In another embodiment, the present disclosure provides a process-management method. The process-management method includes the following steps. A first input instruction is received through a process-planning module of a process-management system. A preset workflow is provided through the process-planning module according to the first input instruction. A second input instruction is received through the process-planning module. The preset workflow is adjusted through the process-planning module according to the second input instruction to generate a customized workflow. A work instruction are generated through a process-management module of the process-management system according to the customized workflow. A workpiece is processed according to the work instruction through a process-executing module of the process-management system.

The process-management system and the process-management method of the present disclosure can be applied to various types of machining industries or processing industries. In order to make the features or advantages of the present disclosure more comprehensible, some embodiments are illustrated hereinafter, and detailed descriptions are provided with reference to the drawings.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 3 is a flowchart showing a process-management method according to an embodiment of the present disclosure.

DETAILED DESCRIPTION

Figure 1:
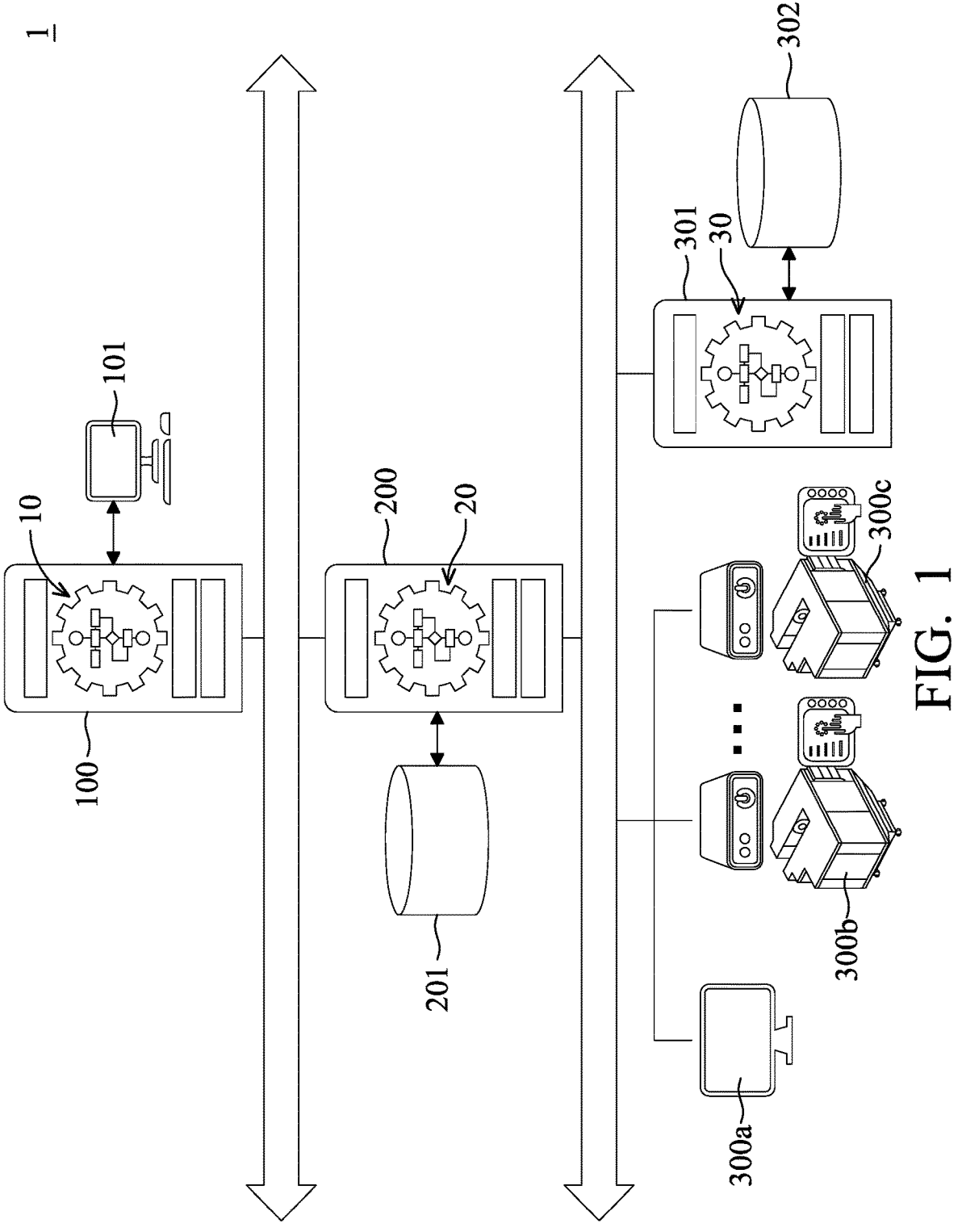
FIG. 1 is a schematic diagram showing a process-management system according to an embodiment of the present disclosure.

The following disclosure provides many different embodiments, or examples, for implementing the provided process-management system and the provided process-management method. Specific features of components and arrangements are described below to simplify the present disclosure. These are, of course, merely examples and are not intended to be limiting. In addition, the present disclosure may repeat reference numerals and/or letters in the various embodiments and examples. This repetition is for the purpose of simplicity and clarity and does not in itself dictate a relationship between the various embodiments and/or examples discussed.

In an embodiment of the present disclosure, terms about disposing and connecting, such as "disposing", "connecting" and similar terms, unless otherwise specified, may refer to two features are in direct contact with each other, or may also refer to two features are not in direct contact with each other, wherein there is an additional connect feature between the two features. The terms about disposing and connecting may also include the case where both features are movable, or both features are fixed.

In addition, ordinal numbers such as "first", "second", and the like used in the specification and claims are configured to modify different features or to distinguish different embodiments or ranges, rather than to limit the number, the upper or lower limits of features, and are not intended to limit the order of manufacture or arrangement of features.

Unless otherwise defined, all terms (including technical and scientific terms) used herein have the same meaning as commonly understood through one of ordinary skill in the art. It should be understood that these terms, such as those defined in commonly used dictionaries, should be interpreted as having meanings consistent with the background or context of the related technology and the present disclosure, and should not be interpreted in an idealized or overly formal manner, unless otherwise specified in the embodiments of the present disclosure.

Some variations of the embodiments are described below. In different figures and described embodiments, the same or similar reference numerals are configured to refer to the same or similar features. It should be understood that additional steps may be provided before, during, and after the method, and that some described steps may be replaced or deleted for another embodiment of the method.

Referring to FIG. 1, which is a schematic diagram showing a process-management system 1 according to an embodiment of the present disclosure. As shown in the figure, the process-management system 1 includes a process-planning module 10, a process-management module 20, and a process-executing module 30; the above-mentioned system and modules are, for example, individually installed or integrated into a terminal, computer and/or a server in the form of software programs and or physical circuits, and control a number of physical machining devices or processing devices to execute a series of arranged machining procedures or processing procedures through being read or enabled.

In an embodiment, the process-planning module 10 may be, for example, installed in the assignment-planning server 100 or the manager terminal 101. Wherein, if the process-planning module 10 is installed and executed in the assignment-planning server 100, the input instruction may be received through the manager terminal 101, and the suggested preset workflow may be provided according to the input instruction (for example, the first input instruction). In addition, the stored preset workflow may also be adjusted through the process-planning module 10 according to the input instruction (for example, the second input instruction), so as to generate the customized workflow that meets the user's actual needs. In an embodiment, both the preset workflow and the customized workflow include the process start-point information, the work item information, and the process end-point information. In the present disclosure, the terms "process start-point information" and "process end-point information" refer to the start and end conditions of the processing process. For example, "process start-point information" may represent the first processing item, and "process end-point information" may represent the last processing item/test item or critical conditions for determining the end of the process (for example, the physical characteristics of the workpiece), but the present disclosure is not limited thereto. In an embodiment, the work item information includes the process sequence information, the process time information, the process resource information, and the processing device information. In other words, the manager may add or delete the process, or adjust the process sequence, the process parameters, the participants of the process, etc., and confirm the increase or decrease of process resources (for example, consumables and costs) of the suggested preset workflow. In addition, the process-planning module 10 may also show the running status of the process-management system 1 according to the input instruction (for example, the third input instruction), such as the current process stage, the status of the current processing device, or the abnormal report, etc.

In an embodiment, the assignment-planning server 100 may include electronic components, such as a processor, a computer-readable medium, and a memory, to execute computer programs to implement the above-mentioned functions of receiving instruction and generating workflows. Wherein, the examples of the processor may include a central processing unit (CPU), a multi-core CPU, a graphics processing unit (GPU), etc., but the present disclosure is not limited thereto. The examples of the computer-readable media may include a compact disc read-only memory (CD-ROM), a hard disk drive, an erasable programmable read-only memory (EPROM), an electrically erasable programmable read-only memory (EEPROM), etc., but the present disclosure is not limited thereto. The examples of the memory may include a dynamic random access memory (DRAM), a static random access memory (SRAM), a flash memory etc., but the present disclosure is not limited thereto. In the present disclosure, the term "computer program" refers to the application stored in the computer-readable medium, which may be read in the memory for being processed through the processor. In an embodiment, the application may be written in any combination of one or more programming languages. The programming language includes an object-oriented programming language, such as Java, Smalltalk, C++, or similar languages, and includes a traditional procedural programming language, such as C programming language or similar programming languages.

In an embodiment, the manager terminal 101 is electrically connected to the assignment-planning server 100, and activates and executes the process-planning module 10 therein, so as to let the manager transmits information to the electronic components and selects instructions. For example, the manager terminal 101 may display the preset workflow according to the first input instruction, may display the customized workflow according to the second input instruction, and may display the running status of the process-management system 1 according to the third input instruction, etc. In an embodiment, the manager terminal 101 may include an input/output device. The examples of the input device may include an alphanumeric keyboard and a pointing device (for example, a cursor controlling device), a camera, a microphone, or similar devices for receiving voice commands, etc., but the present disclosure is not limited thereto. The output device displays images or output data generated through the electronic components. The output device may include, for example, a printer and a display device such as a cathode ray tube (CRT) or a liquid-crystal display (LCD), a speaker, or similar audio output devices. In an embodiment, the manager terminal 101 includes a device having both input and output functions, such as a touch screen.

In an embodiment, the process-management module 20 may be installed and executed, for example, in the assignment-dispatching server 200. The assignment-dispatching server 200 is electrically connected to the assignment-planning server 100, wherein the process-management module 20 may generate the work instruction according to the preset workflow or the customized workflow of the process-planning module 10, and transmit the work instruction according to the running status of the process-executing module 30 to make the process-executing module 30 process the workpiece through the processing device, referring to the following. In an embodiment, the assignment-dispatching server 200 may generate the work instruction according to the process start-point information, the work item information, and the process end-point information of the preset workflow or the customized workflow, and transmit the work instruction to the process-executing module 30, wherein the process-executing module 30 is installed and executed in the data-link server 301, referring to the following. In the present disclosure, the term "work instruction" refers to a machine-readable machining instruction or a processing instruction. In an embodiment, there may be one or more work instructions. Taking the case that there are two work instructions as an example, the first instruction of the work instructions may be first transmitted to the process-executing module 30 through the assignment-dispatching server 200, so as to make the process-executing module 30 perform the first processing on workpiece through the machining or processing device 300b, device 300c, etc., and then, the second instruction of the work instructions may be transmitted to the process-executing module 30 according to the running status transmitted back from the process-executing module 30 through the assignment-dispatching server 200, so as to make the process-executing module 30 perform the second processing on the workpiece through the machining or processing device 300b, device 300c, etc. In other words, the process-management module 20 may generate corresponding work instructions according to the preset workflow or the customized workflow, and dispatch the work instructions in stages (or at the same time) according to the running status transmitted back from the process-executing module 30, so as to realize the process effective management and monitoring. In an embodiment, the examples of the assignment-dispatching server 200 may include electronic components such as a processor, a computer readable medium, and a memory, but the present disclosure is not limited thereto. The types and forms of the electronic components may be referred to above, and the descriptions are omitted herein.

In an embodiment, the process-management system 1 further includes a first database 201, and the first database 201 is electrically connected to the process-management module 20 in the assignment-dispatching server 200. The first database 201 is configured to store the running status transmitted back from the process-executing module 30, and store the start and end conditions of the preset workflow or the customized workflow (for example, process start-point information and process end-point information, etc.) Wherein, the examples of the first database 201 may include a CD-ROM, a flash memory drive, a random access memory (RAM) chip, a hard disk drive, an erasable programmable read-only memory (EPROM), an electrically erasable programmable read only memory (EEPROM), etc., but the present disclosure is not limited thereto.

In an embodiment, the process-executing module 30 may, for example, be installed and executed in the data-link server 301 and control a plurality of machining or processing devices implemented through hardware (for example, the device 300b, the device 300c, etc.) The plurality of machining or processing devices (e.g., device 300b, device 300c, etc.) may include a drawing equipment for drawing engineering graphics, a control equipment for adjusting machine parameters, a processing equipment for performing processing procedures, a measuring equipment for workpieces, a testing equipment for testing workpieces, combinations thereof, or other common equipment in factories, but the present disclosure is not limited thereto.

In an embodiment, the process-management system 1 further includes a second database 302, and the data-link server 301 is electrically connected to the machining or processing devices (for example, device 300b, device 300c, etc.) and the second database 302, so as to store the process information input from a user terminal 300a into the second database 302 and transmit the process information stored in the second database 302 to another or other machining or processing devices (for example, the device 300b, device 300c, etc.). For example, in a combination of processes, the device 300b may be the measuring device for measuring the thickness of the workpiece, and the device 300c may be the processing device for grinding the workpiece. The workpiece thickness data input from the user terminal 300a is stored into the second database 302 through the data-link server 301, so that the subsequent device 300b may grind the workpiece according to the workpiece thickness data. The examples of the data-link server 301 may include electronic components such as a processor, a computer readable media, and a memory, but the present disclosure is not limited thereto. The types and forms of the electronic components may be referred to above, and the descriptions are omitted herein.

In an embodiment, the second database 302 is configured to store the process information. Wherein, the examples of the second database 302 may include a compact disc drive (CD-ROM), a flash memory drive, a random access memory (RAM) chip, a hard disk drive, an erasable programmable read-only memory (EPROM), an electrically erasable programmable read only memory (EEPROM), etc., but the present disclosure is not limited thereto.

As above-mentioned, the present disclosure may select and plan the process to be executed through the process-planning module 10, and manage and dispatch the assignments to the process-executing module 30 through the process-management module 20 to process the workpiece, so as to realize a process-management system with high efficiency, high degree of integration, and high degree of freedom.

It should be noted that although FIG. 1 only shows one process-planning module 10, one process-management module 20, and one process-executing module 30 installed and executed on different servers, the present disclosure is not limited thereto. In other embodiments, the assignment-planning server 100 (and the process-planning module 10 therein) may be a single server installed in a central computer room, which is connected with the plurality of process-management modules 20 and the process-executing modules 30 of remote factories through a wired network or a wireless network, so as to realize the process-management of different processing factories through a single computer program or hardware circuit in the assignment-planning server 100.

Figure 2:
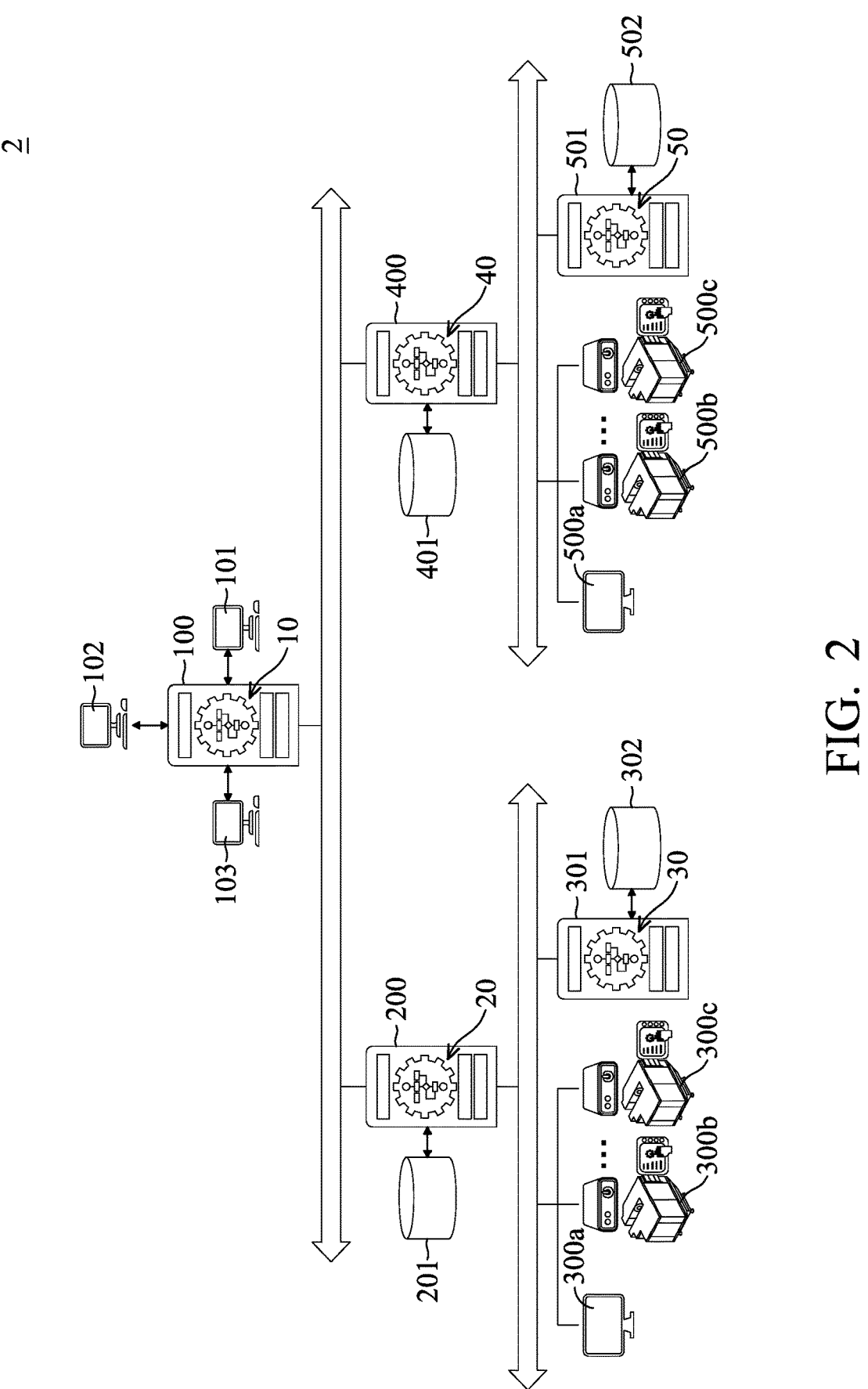
FIG. 2 is a schematic diagram showing a process-management system according to another embodiment of the present disclosure.

Referring to FIG. 2, which is a schematic diagram showing a process-management system 2 according to another embodiment of the present disclosure. In the present embodiment, the assignment-planning server 100 (and the process-planning module 10 therein) is disposed in a central computer room, which may connect to the manager terminal 101, the assignment-dispatching server 200 (and the process-management module 20 therein), the first database 201, the data-link server 301 (and the process-executing module 30 therein), the user terminal 300a, the device 300b, the device 300c, and the second database 302 of the first factory through a wired network or a wireless network, and may connect to the manager terminal 102, the assignment-dispatching server 400 (and the process-management module 40 therein), the first database 401, the data-link server 501 (and the process-executing module 50 therein), the user terminal 500a, the device 500b, the device 500c, and the second database 502 of the second factory through a wired network or a wireless network. In some cases, the assignment-planning server 100 may further connect to the terminal devices (for example, the manager terminal 103) out of the first factory and the second factory through a wired network or a wireless network. In this way, the multiple processing factories may share the same assignment-planning server 100 and the computer programs therein to realize the cross-factory process-management, and even realize the cross-enterprise process-management.

Figure 4:
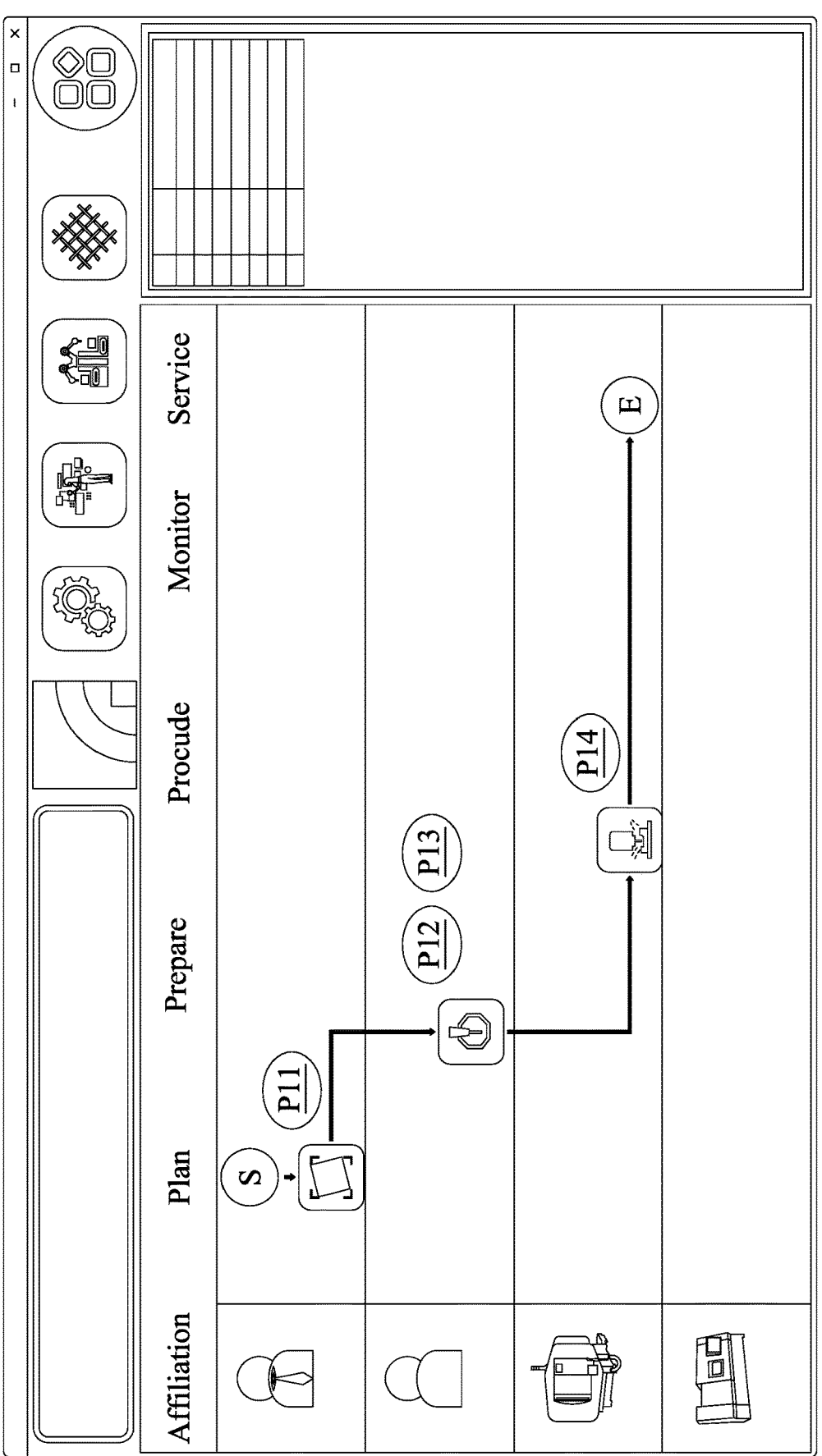
FIG. 4 is a diagram showing a control interface of a computer program according to an embodiment of the present disclosure.
Figure 5:
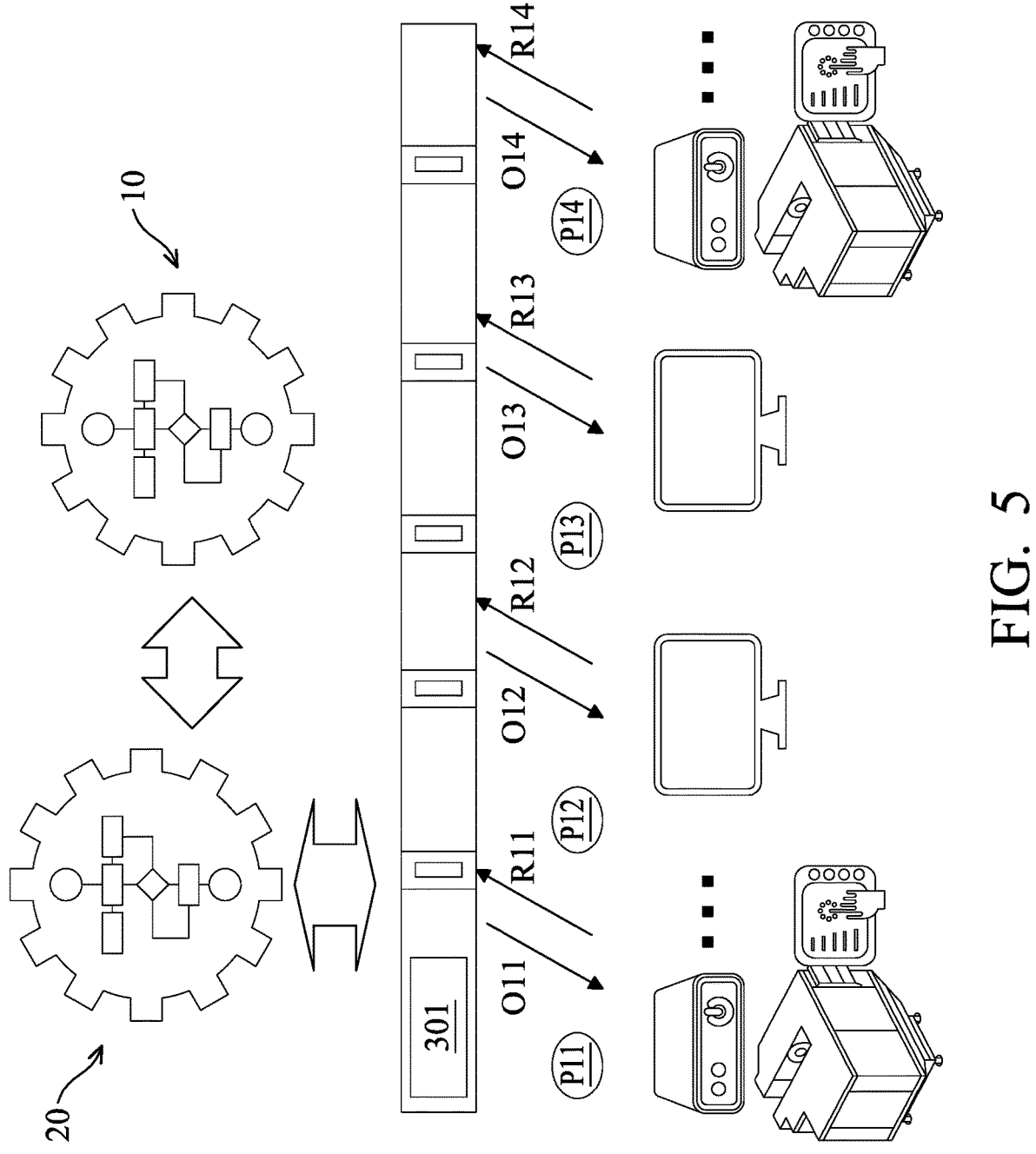
FIG. 5 is a schematic diagram showing a workflow according to an embodiment of the present disclosure.

Referring to FIG. 3, FIG. 4 and FIG. 5, which respectively are a flow chart showing the process-management method, the control interface diagram showing a computer program, and the schematic diagram showing the workflow according to an embodiment of the present disclosure. Specifically, FIG. 4 and FIG. 5 take the deburring process of an automobile valve body as an example to illustrate the actual application of the process-management system and the process-management method disclosed in the present disclosure. Wherein, the control interface diagram shows the start S of the process, the processing of the process (indicated as P), and the end E of the process. As shown in FIG. 3, the step S10 of the process-management method includes receiving the first input instruction through the process-planning module 10 of the process-management system. For example, in the present embodiment, the step S10 refers to selecting the item "deburring process" in the computer program as the first input instruction. The step S12 of the process-management method includes providing the preset workflow through the process-planning module 10 according to the first input instruction. For example, in the present embodiment, the step S12 refers to the computer program sequentially providing the items of "photographing", "burr recognizing", "path generating", and "deburring" as the preset workflow. The step S14 of the process-management method includes receiving the second input instruction through the process-planning module 10. For example, in the present embodiment, the step S14 refers to the user adjusting the process start-point (for example, the first processing item), the work item, and the process end-point (for example, whether additional verification or testing is required) as the second input instruction, wherein the work item includes the process sequence (for example, the sequence of the above-mentioned process), the processing time (for example, the individual processing time of the above-mentioned process), the process resource (for example, consumables used in the above process), and the processing device (for example, the numbers of machine used in the above process) corresponding to the work instruction. The step S16 of the process-management method includes adjusting the preset workflow through the process-planning module 10 according to the second input instruction to generate the customized workflow. For example, in the present embodiment, the step S16 refers to the computer program adjusting the preset parameters of items such as "photographing", "burr recognizing", "path generating", and "deburring" according to the user's input, or adjusting the start and end conditions of the deburring process to generate the customized workflow that meets the user's actual needs.

Continuing from the above, the step S18 of the process-management method includes generating the work instruction through the process-management module 20 of the process-management system to according to the customized workflow. For example, in the present embodiment, the step S18 refers to the process-management module 20 generating the first instruction O11, the second instruction O12, the third instruction O13, and the fourth instruction O14, respectively corresponding to "photographing", "burr recognizing", "path generating", and "deburring". The step S20 of the process-management method includes processing the workpiece through the process-executing module 30 of the process-management system according to the work instruction. For example, in the present embodiment, the step S20 refers to controlling the processing devices corresponding to items such as "photographing", "burr recognizing", "path generating", and "deburring" through the process-executing module 30, thereby performing the first processing P11, the second processing P12, the third processing P13, and the fourth processing P14.

More specifically, in the present embodiment, the step S18 and the step S20 may be performed using the following sub-steps, but the present disclosure is not limited thereto. Firstly, the process-management module 20 transmits the first instruction O11 to the photographic device such as an optical microscope, an electron microscope, etc. or notifies the operator to execute the item of "photographing" of the first process P11 on the workpiece through the photographic equipment. After the first processing P11 is completed, the camera equipment transmits the first reply message R11 and the process information (for example, photo image) back to the process-management module 20, and the process-management module 20 transmits the second instruction O12 to the computer equipment or notifies the operator to execute the item of "burr recognizing" of the second processing P12 on the workpiece on the computer equipment according to the photo image provided from the data-link server 301. After the second processing P12 is completed, the computer equipment transmits the second reply message R12 back to the process-management module 20, and the process-management module 20 transmits the third instruction O13 to the computer equipment or notifies the operator to execute the item of "path generating" of the third process P13 on the workpiece on the computer equipment. After the third processing P13 is completed, the computer equipment transmits the third reply message R13 back to the process-management module 20, and the process-management module 20 transmits the fourth instruction O14 to the cutting equipment or notifies the operator to execute the item of "deburring" of the fourth processing P14 on the workpiece through the cutting equipment. After the fourth processing P14 is completed, the process-management module 20 notifies the process-planning module 10 to notify the user that the customized workflow has been completed according to the fourth reply message R14 of the cutting equipment or after confirming that all items or the workpiece have met the start and end conditions of the process (for example, compared with the process end-point information stored in the first database).

During the above steps, the process-planning module 10 allows users or managers to view various details of the preset workflow or the customized workflow at any time, and also allows users to confirm the current status of each processing equipment or participants of the process. When the process-executing module 30 is abnormal, the process-planning module 10 will also send a notification to notify the user or other maintenance personnel to handle it.

Figure 6:
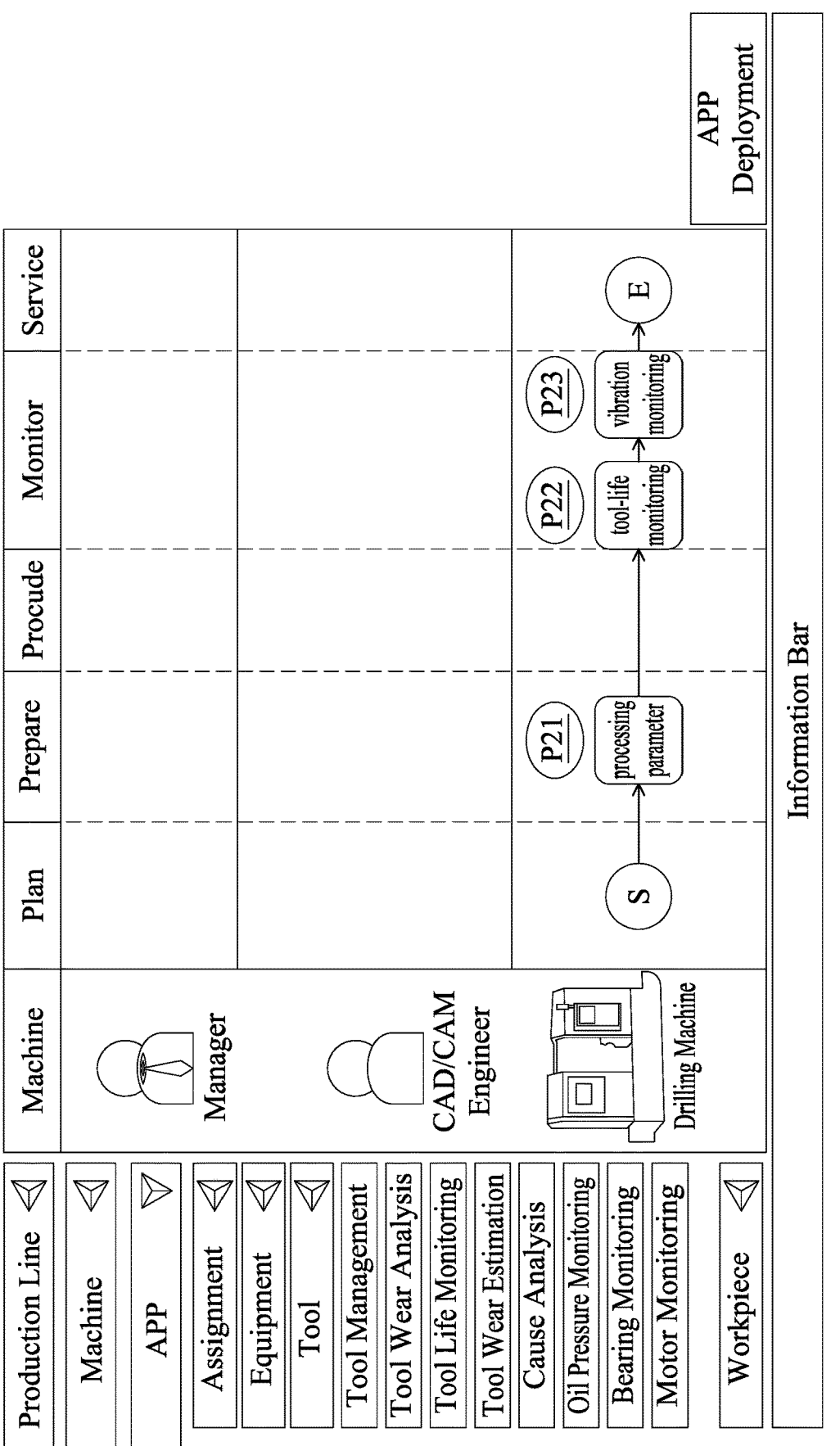
FIG. 6 is a diagram showing a control interface of a computer program according to another embodiment of the present disclosure.
Figure 7:
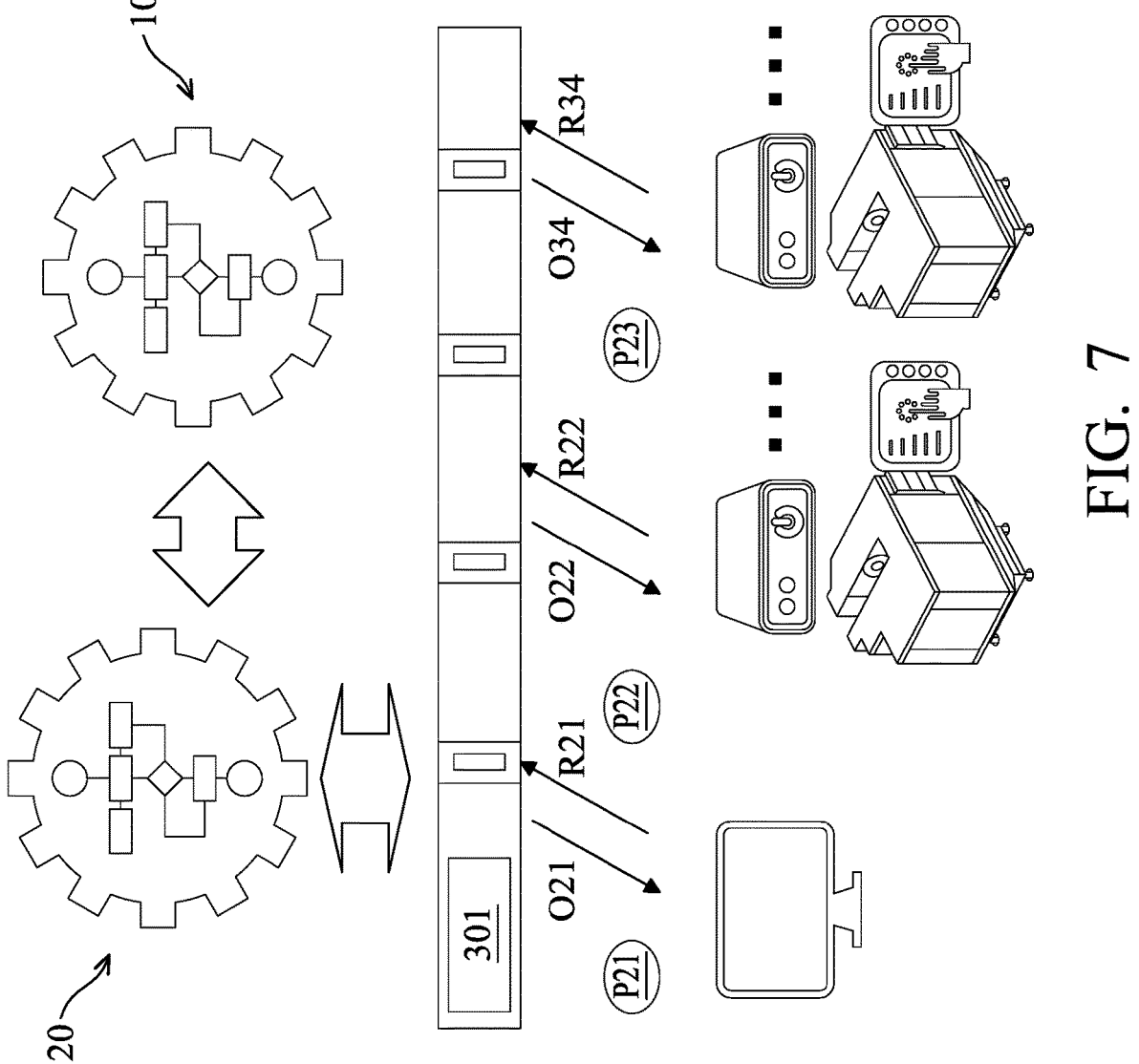
FIG. 7 is a schematic diagram showing a workflow according to another embodiment of the present disclosure.

Referring to FIG. 3, FIG. 6 and FIG. 7, wherein FIG. 6 and FIG. 7 take the drilling process of the bicycle hub production line as an example to illustrate the actual application of the process-management system and the process-management method disclosed in the present disclosure. In the present embodiment, the step S12 refers to the computer program providing items having the following sequence, such as "processing parameter setting", "tool-life monitoring", and "vibration monitoring", as the preset workflow.

The step S16 refers to the computer program adjusting the parameters of the preset items such as "processing parameter setting", "tool-life monitoring", and "vibration monitoring" according to the user's input or the start and end conditions of the drilling process, to generate the customized workflow that meets the user's actual needs. The step S18 refers to the process-management module 20 generating the corresponding first instruction O21, the second instruction O22, and the third instruction O23 respectively according to items such as "processing parameter setting", "tool-life monitoring", and "vibration monitoring". The step S20 refers to controlling the processing devices corresponding to items such as "processing parameter setting", "tool-life monitoring", and "vibration monitoring" through the process-executing module 30, thereby performing the first processing P21, the second processing P22, and the third treatment P23.

The step S18 and the step S20 of the present embodiment may be performed through using the following sub-steps, but the present disclosure is not limited thereto. Firstly, the process-management module 20 transmits the first instruction O21 to the computer equipment or notifies the operator to execute the item of "processing parameter setting" of the first processing P21 on the computer equipment. After the first processing P21 is completed, the computer equipment transmits the first reply message R21 and the process information back to the process-management module 20, and the process-management module 20 transmits the second instruction O22 to the drilling equipment or notifies the operator to drill the workpiece and execute the item of "tool-life monitoring" of the second processing of P22 on the computer equipment. It should be noted that the process-management module 20 of the present embodiment may transmit the third instruction O23 or notify the operator at the same time, so as to execute the item of "vibration monitoring" of the third process P23 on the computer equipment. After the second processing P22 and the third processing P23 are completed, the process-management module 20 notifies the process-planning module 10 to notify the user that the customized workflow has been completed according to the second reply message R22 and the third reply message R23 from the computer equipment or after confirming that all items or the workpiece have met the start and end conditions of the process (for example, compared with the process end-point information stored in the first database).

Figure 8:
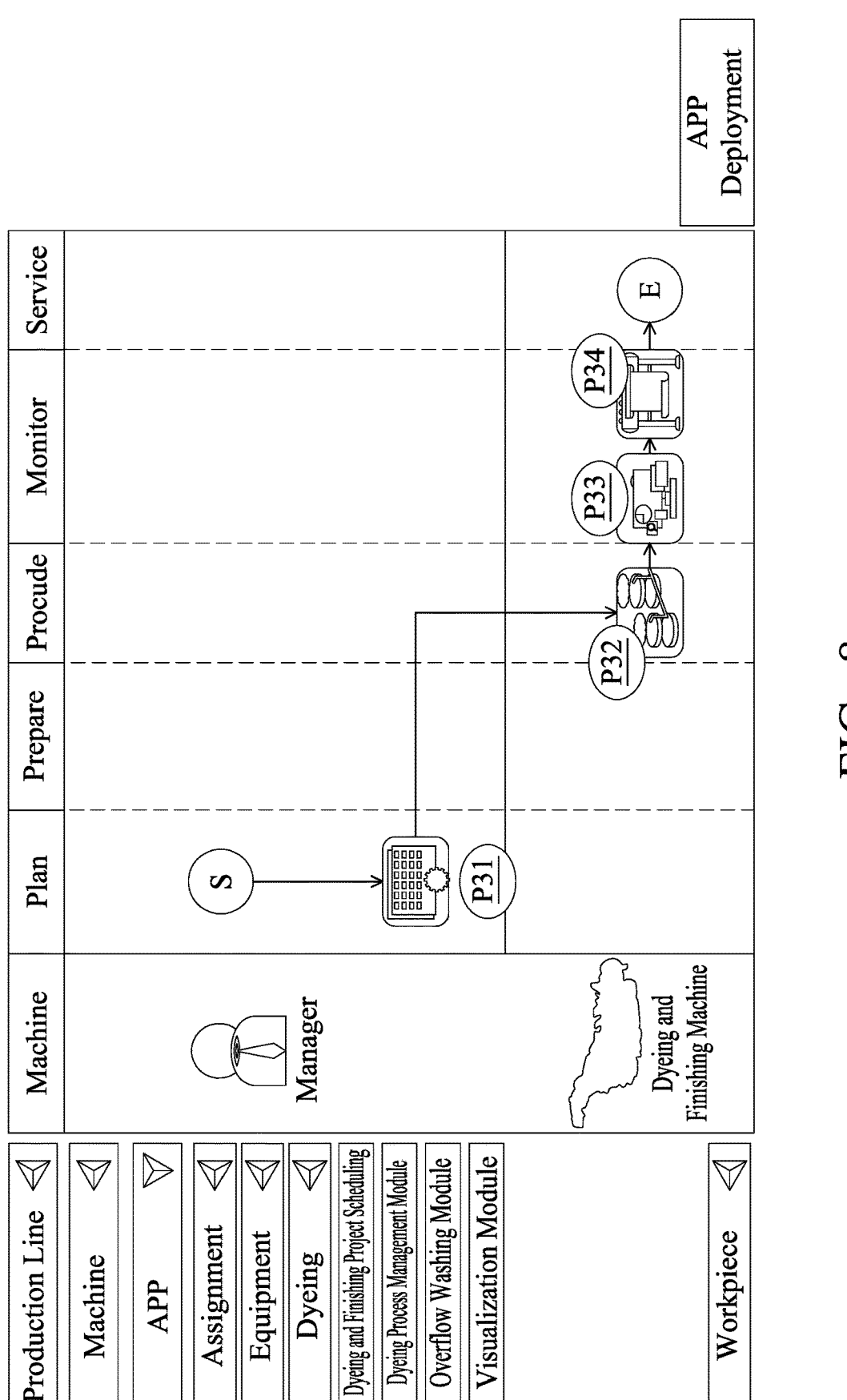
FIG. 8 is a diagram showing a control interface of a computer program according to another embodiment of the present disclosure.
Figure 9:
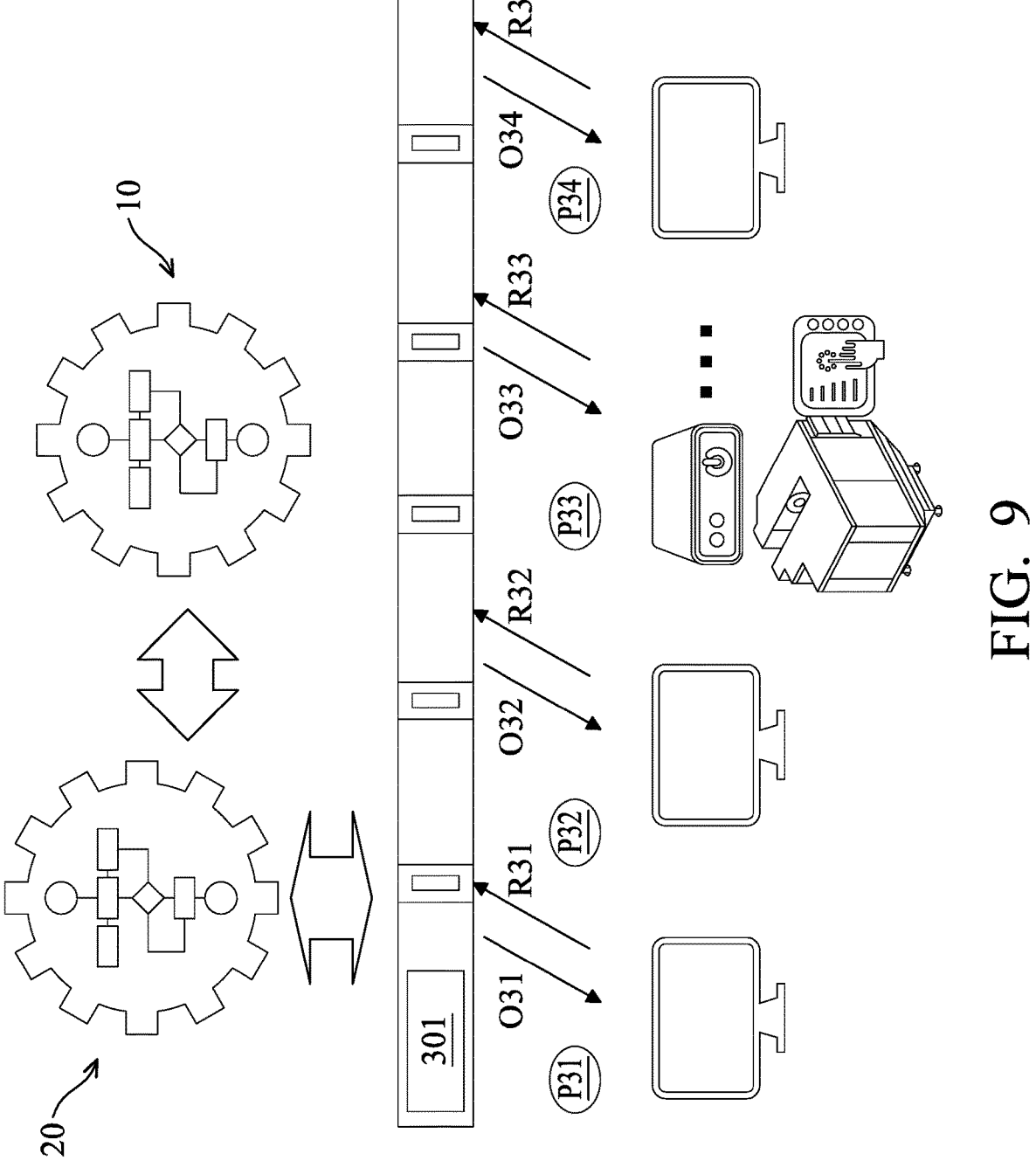
FIG. 9 is a schematic diagram showing a workflow according to yet another embodiment of the present disclosure.

Referring to FIG. 3, FIG. 8 and FIG. 9, wherein FIG. 8 and FIG. 9 take the dyeing and finishing process of textiles as the example to illustrate the actual application of the process-management system and process-management method disclosed in the present disclosure. In the present embodiment, the step S12 refers to the computer program providing items having the following sequence, such as "work order setting of dyeing and finishing", "dyeing-process management", and "visual monitoring of dyeing machine", as the preset workflow. The step S16 refers to the computer program adjusting the preset parameters of items such as "work order setting of dyeing and finishing", "dyeing-process management", "overflow washing treatment", and "visual monitoring of dyeing machine" or the start and end conditions of the drilling process according to the user's input to generate the customized workflow that meets the user's actual needs. The step S18 refers to the process-management module 20 generating the corresponding first instruction O31, the second instruction O32, the third instruction O33, and the fourth instruction O34 respectively according to items such as "work order setting of dyeing and finishing", "dyeing-process management", "overflow washing treatment", and "visual monitoring of dyeing machine". The step S20 refers to controlling the processing devices through the process-executing module 30 corresponding to items such as "work order setting of dyeing and finishing", "dyeing-process management", "overflow washing treatment", and "visual monitoring of dyeing machine", thereby performing the first processing P31, the second processing P32, the third processing P33, and the fourth processing P34.

The step S18 and the step S20 of the present embodiment may be performed through using the following sub-steps, but the present disclosure is not limited thereto. Firstly, the process-management module 20 transmits the first instruction O31 to the computer equipment or notifies the operator to execute the item of "work order setting of dyeing and finishing" of the first processing P31 on the computer equipment. After the first processing P31 is completed, the computer equipment transmits the first reply message R31 back to the process-management module 20, and the process-management module 20 transmits the second instruction O32 to the computer equipment or notifies the operator to execute the item of "work order setting of dyeing and finishing" of the second processing P32. After the second processing P32 is completed, the computer equipment transmits the second reply message R32 back to the process-management module 20, and the process-management module 20 transmits the third instruction O13 to the overflow washing treatment equipment to execute the item of "overflow washing treatment" of the third processing P33 on the workpiece through the washing equipment. After the third processing P33 is completed, the water washing equipment transmits the third reply message R33 back to the process-management module 20, and the process-management module 20 transmits the fourth instruction O34 to the computer equipment or notifies the operator to execute the item of "visual monitoring of dyeing machine" of the fourth processing P34 on the computer equipment. After the fourth processing P34 is completed, the process-management module 20 notifies the process-planning module 10 to notify the user that the customized workflow has been completed according to the fourth reply message R34 form the computer equipment or after confirming that all items or workpieces have met the start and end conditions of the process (for example, compared with the process end-point information stored in the first database).

It should be noted that although the above-mentioned specific implementations of the three process-management methods are provided, the present disclosure is not limited to the above-mentioned processing field, nor is not limited to the above-mentioned specific implementations. In addition, the present disclosure may be applied to process-management in any industrial field, thereby solving at least some problems of the prior art.

The features between the embodiments of the present disclosure may be arbitrarily combined as long as they do not violate or conflict with the spirit of the present disclosure. In addition, the scope of the present disclosure is not limited thereto the process, machine, manufacturing, material composition, device, method, and the step in the specific embodiments described in the specification. A person having ordinary skill in the art will understand current and future process, machine, manufacturing, material composition, device, method, and the step from the content disclosed in the present disclosure, as long as the current or future process, machine, manufacturing, material composition, device, method, and the step performs substantially the same functions or obtain substantially the same results as the present disclosure. Therefore, the scope of the present disclosure includes the above-mentioned process, machine, manufacturing, material composition, device, method, and steps. The scope of the present disclosure should be determined through the scope of the claims. It is not necessary for any embodiment or claim of the present disclosure to achieve all of the objects, advantages, and/or features disclosed herein.

The foregoing outlines several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A process-management method, comprising:
receiving a first input instruction through a process-planning module of a process-management system;
providing a preset workflow through the process-planning module according to the first input instruction;
receiving a second input instruction through the process-planning module;
adjusting the preset workflow through the process-planning module according to the second input instruction to generate a customized workflow, wherein the step of adjusting the preset workflow to generate the customized workflow comprises:
adjusting a process start-point, a work item, and a process end-point of the preset workflow according to the second input instruction, wherein the work item comprises a process sequence, a process time, a process resource, and a processing device corresponding to the work instruction;
generating a work instruction through a process-management module of the process-management system according to the customized workflow; and
processing a workpiece through a process-executing module of the process-management system according to the work instruction, wherein the step of executing the work instruction through the process-executing module of the process-management system comprises:
receiving a first instruction of the work instruction;
performing a first processing on a workpiece according to the first instruction through a first processing device controlled through the process-executing module;
transmitting process information generated through the first processing device to a second processing device;
adjusting a second processing through a second processing device according to the process information;
receiving a second instruction of the work instruction; and
performing the second processing on the workpiece according to the second instruction through the second processing device controlled through the process-executing module.

* * * * *